(12) United States Patent
Hamada et al.

(10) Patent No.: US 9,486,882 B2
(45) Date of Patent: Nov. 8, 2016

(54) NICKEL BRAZING MATERIAL HAVING EXCELLENT CORROSION RESISTANCE

(71) Applicant: FUKUDA METAL FOIL & POWDER CO., LTD., Kyoto-shi, Kyoto (JP)

(72) Inventors: Yukitaka Hamada, Kyoto (JP); Shinichi Nishimura, Kyoto (JP)

(73) Assignee: FUKUDA METAL FOIL & POWDER CO., LTD., Kyoto (JP)

( * ) Notice: Subject to any disclaimer, the term of this patent is extended or adjusted under 35 U.S.C. 154(b) by 0 days.

(21) Appl. No.: 14/782,820

(22) PCT Filed: Mar. 9, 2015

(86) PCT No.: PCT/JP2015/056779
§ 371 (c)(1),
(2) Date: Oct. 7, 2015

(87) PCT Pub. No.: WO2015/156066
PCT Pub. Date: Oct. 15, 2015

(65) Prior Publication Data
US 2016/0045987 A1    Feb. 18, 2016

(30) Foreign Application Priority Data

Apr. 11, 2014  (JP) ................. 2014-081941

(51) Int. Cl.
| | |
|---|---|
| *C22C 19/05* | (2006.01) |
| *B23K 35/30* | (2006.01) |
| *B23K 35/02* | (2006.01) |
| *C22C 19/00* | (2006.01) |
| *C22C 19/03* | (2006.01) |

(52) U.S. Cl.
CPC ......... *B23K 35/304* (2013.01); *B23K 35/0244* (2013.01); *B23K 35/30* (2013.01); *B23K 35/3033* (2013.01); *C22C 19/002* (2013.01); *C22C 19/03* (2013.01); *C22C 19/055* (2013.01); *C22C 19/056* (2013.01)

(58) Field of Classification Search
CPC ............................ C22C 19/055; C22C 19/056
See application file for complete search history.

(56) References Cited

U.S. PATENT DOCUMENTS

| 2010/0028716 A1 | 2/2010 | Nuetzel et al. |
| 2013/0224069 A1 | 8/2013 | Otobe et al. |

FOREIGN PATENT DOCUMENTS

| CN | 102941418 A | 2/2013 |
| EP | 1 207 001 A1 | 5/2002 |
| JP | 3168158 B2 | 5/2001 |
| JP | 2007-075867 A | 3/2007 |
| JP | 2009-202198 A | 9/2009 |
| JP | 2009-545451 A | 12/2009 |
| JP | 2010-269347 A | 12/2010 |
| JP | 2011-110575 A | 6/2011 |
| JP | 2012-183574 A | 9/2012 |
| WO | 2012/035829 A1 | 3/2012 |
| WO | 2013/077113 A1 | 5/2013 |
| WO | 2014/022625 A1 | 2/2014 |

OTHER PUBLICATIONS

International Search Report dated Apr. 21, 2015, issued in counterpart Application No. PCT/JP2015/056779 (3 pages).
Office Action dated May 4, 2016, issued in counterpart Chinese Patent Application No. 20158000285.1. (3 pages).
Extended (supplementary) European Search Report dated May 23, 2016, issued in counterpart European Patent Application No. 15777551.1. (3 pages).

*Primary Examiner* — Jessee Roe
(74) *Attorney, Agent, or Firm* — Westerman, Hattori, Daniels & Adrian, LLP

(57) ABSTRACT

Provided is a nickel brazing material having a melting temperature of 1000° C. or less and acid corrosion resistance. It includes 15.0 to 30.0 mass % of Cr, 6.0 to 18.0 mass % of Cu, 1.0 to 5.0 mass % of Mo. 5.0 to 7.0 mass % of P, 3.0 to 5.0 mass % of Si, and 0.1 to 1.5 mass % of Sn, the remainder being Ni and inevitable impurities, and the total of Si and P being 9.5 mass % to 11.0 mass %. It can include additional element selected from the group consisting of Co, Fe, Mn, C, B, Al, and Ti. The content of Co is 5.0 mass % or less, the content of Fe is 5.0 mass % or less, the content of Mn is 3.0 mass % or less, the total content of C, B, Al, and Ti is 0.5 mass % or less, and the total content of these elements is 10.0 mass % or less.

4 Claims, 1 Drawing Sheet

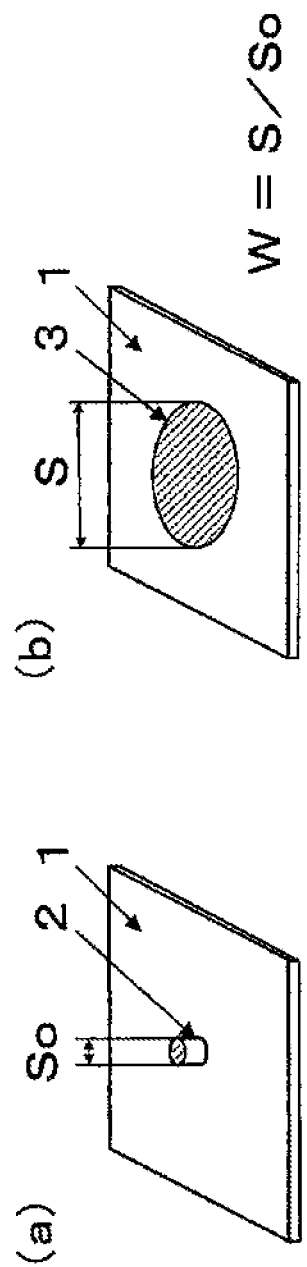

US 9,486,882 B2

NICKEL BRAZING MATERIAL HAVING EXCELLENT CORROSION RESISTANCE

TECHNICAL FIELD

The present invention relates to a brazing material which is used for heat exchanger applications such as general-purpose heat exchangers, water heaters, EGR coolers, and waste heat collecting devices, and which is suitable for joining various stainless steel parts. The present invention particularly relates to a nickel brazing material having a lower melting temperature as compared with general-purpose nickel brazing materials and also having excellent corrosion resistance.

BACKGROUND ART

Conventionally, for brazing for heat exchangers made of stainless steel used for, for example, refrigerant evaporator/condenser, EGR cooler, or hot-water supply applications, copper brazing has been widely applied. However, in recent years, heat exchangers have been required to have higher efficiency, leading to higher-temperature environments, and thus brazing with a copper brazing material has been becoming insufficient in terms of durability.

Thus, replacement with a nickel brazing material, which has corrosion resistance, and oxidation resistance higher than those of a copper brazing material, has been considered. Examples of nickel brazing materials used for joining for a heat exchanger made of stainless steel include BNi2, BNi5, and BNi7 defined in JIS Z 3265:1998, "Nickel Brazing materials".

However, there are problems as follows. BNi5 has a high melting temperature, and thus brazing is performed at a high temperature of 1200° C. or more, resulting in significant thermal effects on the stainless steel base material. BNi2 contains B, and B enters the grain boundary of the brazed stainless steel base material, resulting in a decrease in the strength of the base material. In addition, BNi2 has a low Cr content and thus is inferior in terms of corrosion resistance and heat resistance. BNi7 has a low melting temperature, but its material strength is low. Therefore, joining strength after brazing is low.

Thus, in order to solve such problems, in recent years, for example, novel brazing materials have been proposed such as those described in Patent Documents 1 to 6 below.

The brazing materials described in Patent Documents 1 to 4 below all contain Ni as a main component together with Cr, Si, P, and the like, and they have sufficient joining strength. However, they are either high-melting-point brazing materials having a melting temperature of more than 1000° C. or brazing materials having insufficient corrosion resistance. In addition, although brazing materials having a melting temperature of 1000° C. or less are described in the examples of Patent Documents 5 and 6 below, they have problems of having insufficient material strength or corrosion resistance or containing B that affects the strength of a base material.

Thus, the general-purpose brazing materials defined in JIS Z 3265:1996 "Nickel Brazing materials" and the nickel brazing materials described in Patent Documents 1 to 6, which have been used to date depending on the usage environments, have the problems mentioned above. Under present circumstances, there is no nickel brazing material proposed, which has heat resistance/corrosion resistance and moderate material strength, and also has all the characteristics that allow for brazing at relatively low temperatures.

PRIOR ART DOCUMENTS

Patent Documents

Patent Document 1: Japanese Patent No. 3166158
Patent Document 2: JP-A-7009-202198
Patent Document 3: JP-A-2010-269347
Patent Document 4: WO 2012/035829
Patent Document 5: JP-A-2007-7867
Patent Document 6: JP-A-2011-110575

SUMMARY OF THE INVENTION

Problems to be Solved by the Invention

For brazing for heat exchangers made of stainless steel used for, for example, refrigerant evaporator/condenser, EGR cooler, or hot-water supply applications, a nickel brazing material having heat resistance/corrosion resistance, joining strength, and a relatively low brazing temperature has been required, and the development of a nickel brazing material that satisfies all these characteristics has been a challenge.

The present invention is aimed at solving the problems of the prior art mentioned above, and providing a nickel brazing material having a lower brazing temperature, moderate material strength, and excellent corrosion resistance.

Means for Solving the Problems

In the present invention, in the study of alloy composition for developing a nickel brazing material having a low brazing temperature, moderate material strength, and excellent corrosion resistance, the following targets have been set, and it is required that these are all satisfied.
(Target Values)
(1) Melting temperature [liquidus temperature] 1000° C. or less
(2) Material strength [bending strength]: 600 N/mm² or more
(3) Corrosion resistance [corrosion weight loss by sulfuric acid]: 0.50 mg/m²·s or less The alloy (nickel brazing material) of the present invention, which satisfies all the above target values, has a feature of having a melting temperature of 1000° C. or less and also having acid corrosion resistance, wherein the composition of the alloy includes 15.0 to 30.0 mass % of Cr, 6.0 to 18.0 mass % of Cu, 1.0 to 5.0 mass % of Mo, 5.0 to 7.0 mass % of P, and 3.0 to 5.0 mass % of Si, with the remainder being Ni and inevitable impurities, and the total of Si and P being 9.5 to 11.0 mass %.

Here, "inevitable impurities" means impurities that are not intentionally added but are inevitably mingled during the steps of producing each raw material, etc. Examples of such impurities include Mg, S, O, N, V, and Sr. The total thereof is usually 0.3 mass % or less, and this does not affect the effect of the present invention.

The nickel brazing material of the present invention is characterized in that the nickel brazing material having the above characteristics includes 0.1 to 1.5 mass % of Sn.

In addition, the nickel brazing material of the present invention is characterized in that the nickel brazing material having the above characteristics further includes, as an element that does not adversely affect the characteristics of the nickel brazing material, at least one element selected from the group consisting of Co, Fe, Mn, C, B, Al, and Ti, and the content of Co is 5.0 mass % or less, the content of Fe is 5.0 mass % or less, the content of Mn is 3.0 mass % or less, the total content of C, B, Al, and Ti is 0.5 mass % or less, and the total content of Co, Fe, Mn, C, F, Al, and Ti is 10.0 mass % or less.

The reasons why the range of each component is limited as above in the present invention will be described below.

Cr is dissolved in Ni solid solution to improve the heat resistance, corrosion resistance, and material strength of the alloy and further contributes to the adjustment of the melting temperature. However, the effect cannot be sufficiently obtained when the content is less than 15.0 mass %. In addition, when the content is more than 30.0 mass %, the melting temperature increases, and also wetting and spreading on a base material decrease during the brazing process, resulting in a decrease in brazing operability. For this reason, the content of Cr has been specified to be within a range of 15.0 to 30.0 mass %.

Cu is dissolved in Ni solid solution to contribute to the lowering of the melting temperature and also improve the corrosion resistance, but the effect is insufficient when the content is less than 6.0 mass %. When the content is more than 18.0 mass %, the melting temperature increases, and also the material strength decreases. Therefore, the content of Cu has been specified to be within a range of 6.0 to 18.0 mass %.

Mo is dissolved in Ni solid solution to contribute to the lowering of the melting temperature and also improve the corrosion resistance, but the effect is insufficient when the content is less than 1.0 mass %. When the content is more than 5.0 mass %, the melting temperature increases. Therefore, the content of Mo has been specified to be within a range of 1.0 to 5.0 mass %.

P is effective in lowering the melting point of the alloy through eutectic reaction with Ni, and also improves the fluidity to improve wetting and spreading on a stainless steel base material. However, the effect cannot be sufficiently exerted when the content is less than 5.0 mass %. In addition, when the content is more than 7.0 mass %, the material strength significantly decreases, making it impossible to obtain satisfactory joining strength. Therefore, the content of P has been specified to be within a range of 5.0 to 7.0 mass %.

Si is, like P, effective in lowering the melting point of the alloy through eutectic reaction with Ni, and also exerts a flux effect to improve the brazing operability. However, the effect is not exerted when Si is less than 3.0 mass %. When the content is more than 5.0 mass %, an intermetallic compound is excessively formed with Ni or resulting in a decrease in material strength. Therefore, the content of Si has been specified to be within a range of 3.0 to 5.0 mass %.

Further, when the total of Si and P is less than 9.5 mass %, their effectiveness in lowering the melting point is not sufficiently obtained, while when the total is more than 11.0 mass %, hyper-eutectic are formed, resulting in a significant decrease in material strength. For this reason, the total of Si+P has been specified to be within a range of 9.5 to 11.0 mass %.

Sn improves the fluidity of a molten brazing material during brazing, and improves the wettability on a stainless steel base material. However, the effect is insufficient when the content of Sn is less than 0.1 mass %, while when the content is more than 1.5 mass %, large amounts of compounds are formed with Cu, resulting in an increase in melting temperature and also a decrease in material strength or corrosion resistance. Therefore, the content of Sn has been specified to be within a range of 0.1 to 1.5 mass %.

In addition, the nickel brazing material of the present invention may contain, as an element that does not adversely affect the characteristics of the nickel brazing material, 5.0 mass % or less of Co, 5.0 mass % or less of Fe, 3.0 mass % or less of Mn, and C, B, Al, and Ti in a total of 0.5 mass % or less. However, in order to satisfy all the targeted set values of corrosion resistance, material strength, and melting temperature, the upper limit of the total of Co, Fe, Mn, B, Al, and Ti has been specified to be 10.0 mass %. In the present invention, it is particularly preferable that the upper limit of the total is 4.0 mass % or less.

The content of Ni in the nickel brazing material of the present invention is 35 mass % or more, preferably 39 mass % or more.

Effect of the Invention

The nickel brazing material of the present invention has the following characteristics, and thus is effective in application to a heat exchanger made of stainless steel used for, for example, refrigerant evaporator, condenser, or hot-water supply applications.

(1) The liquidus temperature is 1000° C. or less, and thus the heat treatment (brazing) temperature can be made low.

(2) The material strength of the brazing material alloy itself is high, and this moderate joining strength can be obtained by brazing.

(3) Corrosion resistance in a sulfuric acid or nitric acid environment is excellent.

BRIEF DESCRIPTION OF THE DRAWINGS

FIG. 1 is a schematic diagram for explaining a brazing test on a brazing material alloy.

MODE FOR CARRYING OUT THE INVENTION

The nickel brazing material of the present invention can be obtained as follows: a bare metal prepared by adjusting and blending Ni, that is the base, and additional components Cr, Cu, Mo, P, and Si to predetermined mass %, and also adding predetermined amounts of Sn, Co, Fe, Mn, and the like as necessary, is completely melted in a crucible of a melting furnace, and then the molten alloy is formed into a powder by an atomizing method or a melt-grinding method or is cast in a predetermined mold into a rod or a plate.

Particularly in the case of an alloy powder produced by an atomizing method, after adjusting the particle size suitable for the intended working method, as a method for installing the brazing material of the present invention on a stainless steel base material, various methods can be freely selected, including a method in which a binder and the powder are scattered and applied (sprayed) to the base material surface, a method in which a binder and the powder are mixed into a paste and applied, a method in which the powder is processed into a sheet or a foil and placed, a method in which the powder is thermally sprayed and placed, etc.

EXAMPLES

The alloys of the examples of the present invention and the alloys of the comparative examples that had been adjusted and blended in the above manner were ingoted, and subjected to the measurement of liquidus temperature, the measurement of bending strength, the measurement of corrosion weight loss by sulfuric acid, and a brazing test by the following methods.

(1) Measurement of Liquidus Temperature

The melting point temperature was measured by a thermal analysis method, in which 100 g of a bare metal having each alloy composition was heated to about 1500° C. in an argon stream using an electric furnace, thus melted, and then allowed to cool naturally in the furnace while continuously measuring the temperature of the alloy. That is, a thermal analysis curve was drawn by a recorder connected to a thermocouple inserted into the central portion of the molten metal, and the liquidus temperature was read from the cooling curve.

(2) Measurement of Bending Strength

A bare metal was melted by the same method as in (1) above, and the molten metal was cast in a quartz glass tube and then subjected to machine processing to have a size of about φ5×35 mm, thereby to give a specimen. Next, the specimen was placed on a bending strength test jig (supported at three points, the distance between supports: 25.4 mm (JIS Z 2511:2006, "Jig described in Metal Powder-Measurement Method for Green Strength by Bending Test)), then a load was applied with a universal tester, and the load at break was measured. From the shape of the specimen and the breaking load, the bending strength (N/mm$^2$) of the alloy was calculated.

(3) Measurement of Corrosion Weight Loss by Sulfuric Acid

A bare metal was melted by the same method as in above. The molten metal was cast in a shell mold, and the cast piece was then subjected to machine processing to have a size of about 10×10×20 mm, thereby to give a specimen. Next, a 1% aqueous sulfuric acid solution was prepared in a 300-cc beaker, and the specimen was put thereinto and subjected to a corrosion test by an immersion method. The test conditions were as follows: test temperature: 80° C., test time: 6 hours. Then, the mass loss per unit area per unit time before and after the test was calculated as the corrosion weight loss (mg/m$^2$·s), and corrosion resistance to sulfuric acid was evaluated.

Indices of evaluation are as follows.

"Corrosion weight loss≤0.50 mg/m$^2$·s: ○"

"Corrosion weight loss>0.50 mg/m$^2$·s: x"

(4) Brazing Test:

An example alloy was melted in an electric furnace having an argon gas atmosphere, and the molten metal was cast in a graphite mold to give a cast piece in the form of a 5 mm-φrod. The cast piece was cut to a weight of about 0.5 g to give a brazing material sample. Next, as shown in FIG. 1(a), the brazing material sample was placed on an SUS 304 stainless steel base material, and subjected to a brazing heat treatment (hereinafter referred to as brazing) at 1030° C. for 30 minutes in a vacuum of $10^{-4}$ to $10^{-3}$ torr. After brazing, as shown in FIG. 1(b), the area S of the molten and spread brazing material was measured. The area S was divided by the cross-sectional area So of the sample before brazing, that is, a brazing spreading coefficient W (=S/So) was determined, and used as an index of the wettability of the brazing material alloy on an SUS 304 stainless steel base material.

With respect to comparative example alloys having a melting temperature of more than 1000° C., because they do not melt under the same conditions, it was not possible to perform comparative evaluation. In addition, with respect to comparative example alloys having a melting temperature of 1000° C. or less, it was revealed that they were inferior to example alloys in terms of bending strength and/or corrosion resistance, and thus no brazing test was performed. Therefore, in Table 2 and Table 3, Brazing Spreading Coefficient at 1030° C., W, is not shown.

Table 1 shows the examples of the present invention, and Table 2 and Table 3 Snow the comparative examples.

TABLE 1

| Example No. | Chemical component (mass %) | | | | | | P + Si (mass %) | Liquidus temperature (° C.) | Bending strength (N/mm$^2$) | Sulfuric acid-resistance | Brazing at 1030° C. Spreading coefficient, W |
|---|---|---|---|---|---|---|---|---|---|---|---|
| | Ni | Cr | P | Si | Cu | Mo Others | | | | | |
| 1 | 46.2 | 29.0 | 6.8 | 3.1 | 13.0 | 1.9 — | 9.9 | 995 | 730 | ○ | 16.2 |
| 2 | 47.8 | 28.1 | 5.2 | 4.8 | 10.5 | 3.4 0.2B | 10.0 | 990 | 790 | ○ | 14.7 |
| 3 | 50.8 | 24.9 | 6.6 | 3.2 | 10.0 | 4.5 — | 9.8 | 1000 | 620 | ○ | 16.0 |
| 4 | 47.6 | 23.0 | 5.4 | 4.2 | 17.5 | 2.3 — | 9.6 | 995 | 780 | ○ | 14.4 |
| 5 | 55.5 | 17.2 | 6.2 | 4.2 | 13.7 | 3.0 0.2C | 10.4 | 965 | 660 | ○ | 15.4 |
| 6 | 52.7 | 26.0 | 6.8 | 3.7 | 7.2 | 3.5 0.1Ti | 10.5 | 950 | 610 | ○ | 15.9 |
| 7 | 50.1 | 29.0 | 5.7 | 4.2 | 6.3 | 4.7 — | 9.9 | 1000 | 750 | ○ | 15.1 |
| 8 | 49.67 | 25.2 | 5.5 | 4.8 | 13.7 | 1.1 0.03Al | 10.3 | 985 | 930 | ○ | 14.8 |
| 9 | 52.4 | 25.0 | 5.9 | 4.1 | 10.2 | 2.4 — | 10.0 | 985 | 1010 | ○ | 15.4 |
| 10 | 50.4 | 26.5 | 5.8 | 4.4 | 10.0 | 2.4 0.5Sn | 10.2 | 985 | 1040 | ○ | 20.6 |
| 11 | 51.2 | 24.3 | 6.0 | 3.8 | 11.0 | 2.8 0.9Sn | 9.8 | 990 | 920 | ○ | 26.8 |
| 12 | 59.7 | 16.5 | 5.6 | 4.0 | 8.8 | 2.4 3Co | 9.6 | 990 | 800 | ○ | 14.8 |
| 13 | 56.6 | 20.7 | 6.1 | 4.7 | 6.6 | 2.3 3Fe | 10.8 | 995 | 960 | ○ | 15.8 |
| 14 | 54.4 | 21.6 | 6.6 | 4.2 | 10.0 | 1.2 2Mn | 10.8 | 980 | 620 | ○ | 16.1 |
| 15 | 39.4 | 28.8 | 6.2 | 3.7 | 17.5 | 1.2 3Co, 0.2C | 9.9 | 995 | 900 | ○ | 15.7 |

TABLE 2

| Comp. Ex. No. | Chemical component (mass %) | | | | | | P + Si (mass %) | Liquidus temperature (° C.) | Benging strength (N/mm²) | Sulfric acid-resistance |
|---|---|---|---|---|---|---|---|---|---|---|
| | Ni | Cr | P | Si | Cu | Mo | Others | | | |
| a | 40.0 | 33.0 | 7.0 | 3.0 | 15.0 | 2.0 | — | 10.0 | 1080 | 1020 | ○ |
| b | 58.5 | 26.2 | 6.0 | 4.0 | 3.0 | 2.3 | — | 10.0 | 1040 | 880 | ○ |
| c | 39.8 | 29.0 | 6.1 | 4.0 | 20.0 | 1.1 | — | 10.1 | 1110 | 580 | ○ |
| d | 50.2 | 20.0 | 6.0 | 3.8 | 12.0 | 8.0 | — | 9.8 | 1120 | 710 | ○ |
| e | 58.6 | 18.0 | 7.5 | 3.4 | 10.0 | 2.5 | — | 10.9 | 1000 | 430 | ○ |
| f | 56.0 | 22.0 | 4.5 | 5.5 | 10.0 | 2.0 | — | 10.0 | 990 | 420 | ○ |
| g | 55.3 | 21.0 | 6.9 | 4.8 | 9.0 | 3.0 | — | 11.7 | 1050 | 400 | ○ |
| h | 57.6 | 20.0 | 5.7 | 3.2 | 12.0 | 1.5 | — | 8.9 | 1065 | 780 | ○ |
| i | 50.8 | 22.0 | 6.5 | 3.5 | 12.0 | 2.4 | 2.8Sn | 10.0 | 1030 | 520 | X |
| j | 51.0 | 22.0 | 6.0 | 4.0 | 10.0 | — | 7Co | 10.0 | 1000 | 960 | X |
| k | 46.3 | 25.0 | 5.5 | 5.0 | 8.0 | 2.2 | 8Fe | 10.5 | 1090 | 1140 | ○ |
| l | 55.5 | 12.0 | 6.0 | 4.0 | 15.0 | 2.5 | 5Mn | 10.0 | 995 | 460 | X |

TABLE 3

| Comp. Ex. No. | Chemical component (mass %) | | | | | | | P + Si (mass %) | Liquidus temperature (° C.) | Bending strength (N/mm²) | Sulfric acid-resistance |
|---|---|---|---|---|---|---|---|---|---|---|---|
| | Ni | Cr | P | Si | Cu | Mo | Others | | | | |
| A | 82.5 | 7.0 | — | 4.5 | — | — | Fe: 3.0, B: 3.0 | 4.5 | 1010 | 790 | X |
| B | 70.8 | 19.0 | — | 10.2 | — | — | — | 10.2 | 1140 | 1150 | ○ |
| C | 77.0 | 13.0 | 10.0 | — | — | — | — | 10.0 | 930 | 400 | ○ |
| D | 74.0 | 15.0 | 7.6 | 3.4 | — | — | — | 11.0 | 940 | 440 | X |
| E | 58.5 | 30.0 | 6.9 | 4.6 | — | — | — | 11.5 | 995 | 470 | ○ |
| F | 53.0 | 29.0 | 4.0 | 4.0 | 10.0 | — | — | 8.0 | 1105 | 1050 | ○ |
| G | 44.0 | 30.0 | 6.0 | 5.0 | 15.0 | — | — | 11.0 | 1068 | 950 | ○ |
| H | 54.0 | 20.0 | 6.0 | 5.0 | 15.0 | — | — | 11.0 | 1033 | 960 | ○ |
| I | 50.0 | 25.0 | 5.0 | 5.0 | 10.0 | — | 5Fe | 10.0 | 1055 | 1080 | ○ |
| J | 44.0 | 25.0 | 5.0 | 6.0 | 10.0 | — | 10Fe | 11.0 | 1055 | 1250 | ○ |
| K | 78.35 | 11.5 | 8.3 | 1.1 | — | — | 0.75B | 9.4 | 940 | 540 | X |
| L | 77.3 | 13.0 | 6.0 | 3.0 | — | — | 0.7B | 9.0 | 960 | 460 | X |
| M | 60.9 | 10.0 | 8.1 | — | — | — | 21Fe | 8.1 | 930 | 510 | X |
| N | 44.0 | 20.0 | 9.0 | — | — | — | 27Fe | 9.0 | 990 | 560 | X |
| O | 57.5 | 18.0 | 6.5 | 3.0 | 3.0 | 12.0 | — | 9.5 | 1020 | 810 | ○ |
| P | 61.0 | 20.0 | 6.5 | 2.5 | — | 10.0 | — | 9.0 | 1035 | 980 | ○ |

Alloys Nos. 1 to 15 shown in Table 1 are the examples of the present invention, and they all have a liquidus temperature, of 1000° C. or less. In addition, they all show a bending strength of 600 N/mm² or more, indicating that the example alloys of the present invention have excellent material strength.

Further, with respect to sulfuric acid corrosion resistance, the corrosion weight losses under the test conditions are all 0.50 mg/m²·s or less, indicating that the example alloys of the present invention have excellent corrosion resistance to sulfuric acid.

The results of the brazing test at 1030° C. show that all the example alloys can be completely melted and have excellent wettability on an SUS 304 stainless steel base material, and also that the compositions (10) and (11) containing Sn particularly have a large brazing spreading coefficient of 20 or more.

Meanwhile, with respect to alloys shown in Table 2, the brazing materials (a) to (l) have compositions out of the range, of the alloy of the present invention, and they fail to satisfy at least one of the target values of liquidus temperature, bending strength, and sulfuric acid resistance. Specifically, (a) exceeds the claimed upper limit of the Cr amount, (b) and (c) are out of the claimed Cu amount, and (d) exceeds the claimed upper limited of the Mo amount. These alloys all have a liquidus temperature of more than 1000° C. (e) to (h) are out of the claimed P or Si amount or P+Si amount, and have a liquidus temperature of more than 1000° C. or have poor material strength (bending strength). (i) to (l) exceed the claimed upper limit of the content of additional elements, and they all fail to satisfy at least one of the target characteristics.

Comparative brazing materials (A), (B), and (C) shown in Table 3 have, the conventional Ni-based brazing material alloy compositions defined by JIS and WE standards. Comparative, example brazing materials (D) to (P) are prior art nickel brazing materials described in "Japanese Patent No. 3168158", "JP-A-2009-202198", "JP-A-2010-269347", "WO 2012/035829", "JP-A-2007-75867", and "JP-A-2011-110575", respectively.

These brazing materials shown in Table 3 all fail to satisfy at least one of the target values of liquidus temperature, bending strength, and corrosion resistance to sulfuric acid.

The example alloys of the present invention show excellent wetting on various stainless steel base materials, and also show excellent brazing properties in brazing atmospheres including, in addition to vacuum, a reducing hydrogen atmosphere and an inert argon atmosphere.

INDUSTRIAL APPLICABILITY

As described above in detail, the nickel brazing material of the present invention has a melting temperature of 1000° C. or less, and the material strength of the brazing material itself is high. Further, it exerts excellent corrosion resistance to acids, such as sulfuric acid. Thus, the nickel brazing material of the present invention is suitable for the joining (brazing) of various stainless steel parts. Without being limited to refrigerant evaporator, condenser, and hot-water supply applications, it can be widely used to environment- and energy-related heat exchangers.

DESCRIPTION OF REFERENCE SIGNS

So: Cross-sectional area of a brazing material sample
S: Spreading area of an alloy after brazing
W: Brazing spreading coefficient (S/So)
1: Base material (SUS 304 stainless steel)
2: Brazing material sample before brazing (ϕ5 mm, about 0.5 g)
3: Moten and spread brazing material alloy after brazing

The invention claimed is:

1. A nickel brazing material having a melting temperature of 1000° C. or less and also having acid corrosion resistance, wherein the nickel brazing material comprises 15.0 to 30.0 mass % of Cr, 6.0 to 18.0 mass % of Cu, 1.0 to 5.0 mass % of Mo, 5.0 to 7.0 mass % of P, and 3.0 to 5.0 mass % of Si, with the remainder being Ni and inevitable impurities, and the total of Si and P being 9.5 to 11.0 mass %.

2. The nickel brazing material according to claim 1, further comprising, as an element that improves the wettability of the nickel brazing material on a stainless steel base material, 0.1 to 1.5 mass % of Sn.

3. The nickel brazing material according to claim 1, further comprising, as an element that does not adversely affect the characteristics of the nickel brazing material, at least one element selected from the group consisting of Co, Fe, Mn, C, B, Al, and Ti, wherein the content of Co is 5.0 mass % or less, the content of Fe is 5.0 mass % or less, the content of Mn is 3.0 mass % or less, the total content of C, B, Al, and Ti is 0.5 mass % or less, and the total content of Co, Fe, Mn, C, B, Al, and Ti is 10.0 mass % or less.

4. The nickel brazing material according to claim 2, further comprising, as an element that does not adversely affect the characteristics of the nickel brazing material, at least one element selected from the group consisting of Co, Fe, Mn, C, B, Al, and Ti, wherein the content of Co is 5.0 mass % or less, the content of Fe is 5.0 mass % or less, the content of Mn is 3.0 mass % or less, the total content of C, B, Al, and Ti is 0.5 mass % or less, and the total content of Co, Fe, Mn, C, B, Al, and Ti is 10.0 mass % or less.

\* \* \* \* \*